United States Patent [19]

Murayama et al.

[11] Patent Number: 5,908,691
[45] Date of Patent: *Jun. 1, 1999

[54] MAGNETIC RECORDING MEDIUM HAVING A LOWER LAYER CONTAINING A SPECIFIED POLYURETHANE BINDER

[75] Inventors: Yuichiro Murayama; Masaki Satake; Hiroshi Hashimoto; Tsutomu Okita, all of Odawara, Japan

[73] Assignee: Fuji Photo Film Co., Ltd., Kanagawa, Japan

[ * ] Notice: This patent is subject to a terminal disclaimer.

[21] Appl. No.: 08/772,575

[22] Filed: Dec. 26, 1996

[30] Foreign Application Priority Data

Dec. 26, 1995 [JP] Japan ................................. 7-338465

[51] Int. Cl.$^6$ ................................................. G11B 05/702
[52] U.S. Cl. ........................ 428/323; 428/336; 428/425.9; 428/694 BU; 428/694 BL; 428/694 BS; 428/694 BM; 428/900
[58] Field of Search ........................ 428/425.9, 694 BU, 428/694 BL, 694 BS, 694 BM, 900, 323, 336

[56] References Cited

U.S. PATENT DOCUMENTS

| | | | |
|---|---|---|---|
| 4,637,959 | 1/1987 | Ninomiya et al. | 428/425.9 |
| 5,153,071 | 10/1992 | Watanabe et al. | 428/425.9 |
| 5,702,821 | 12/1997 | Murayama et al. | 428/425.9 |

*Primary Examiner*—Stevan A. Resan
*Attorney, Agent, or Firm*—Sughrue, Mion, Zinn Macpeak & Seas, PLLC

[57] ABSTRACT

The present invention provides a magnetic recording medium having high durability and excellent electromagnetic transfer characteristics and having a lower coating layer, which contains a binder and has high dispersion property and durability. The magnetic recording medium comprises a lower coating layer where non-magnetic powder or ferromagnetic power is dispersed in a binder and an upper magnetic layer where ferromagnetic powder is dispersed in a binder, said two layers being placed on a non-magnetic support member, whereby the binder of the lower coating layer comprises polyurethane resin, which is a reaction product using diol and organic diisocyanate as major materials, the polyurethane resin contains short-chain diol having cyclic structure by 17 to 40 weight %, and the polyurethane resin contains long-chain diol, containing ether groups by 1.0 to 5.0 mmol/g to the entire polyurethane resin, by 10 to 50 weight %.

12 Claims, No Drawings

5,908,691

MAGNETIC RECORDING MEDIUM HAVING A LOWER LAYER CONTAINING A SPECIFIED POLYURETHANE BINDER

BACKGROUND OF THE INVENTION

The present invention relates to a magnetic recording medium having excellent electromagnetic transfer characteristics and comprising a plurality of layers, i.e. at least two layers including an upper magnetic layer where ferromagnetic fine powder and a binder are dispersed and a lower coating layer.

The magnetic recording medium is widely used in tape for tape recording, video tape, floppy disk, etc. In the magnetic recording medium, a magnetic layer where ferromagnetic powder is dispersed in a binder is deposited on a non-magnetic support member.

The magnetic recording medium must be at high level in various characteristics such as electromagnetic transfer characteristics, running durability and running performance. Namely, an audio tape for recording and reproducing musical sound must have higher ability to reproduce original sound. A video tape must have excellent electromagnetic transfer characteristics such as high ability to reproduce original image. In particular, a magnetic recording medium for digital video tape recorder, which must be suitable for high density recording, must have higher electromagnetic transfer characteristics.

In addition to the excellent electromagnetic characteristics as described above, the magnetic recording medium must have good running durability as already described. To ensure good running durability, abrasive and lubricant are added in the magnetic layer.

However, to obtain good running durability by the use of abrasive, it is necessary to increase the quantity of the added abrasive to some extent. As a result, filling degree of the ferromagnetic powder decreases. In case an abrasive material having larger particle size is used to obtain good running durability, the abrasive material is more likely to protrude or to produce roughness on the surface of the magnetic layer. Therefore, the improvement of running durability by the use of abrasive often leads to deterioration of the electromagnetic transfer characteristics.

When it is tried to improve the running durability by the use of lubricant, it is necessary to increase the quantity of the added lubricant. As a result, the binder is more likely to be plasticized, and the durability of the magnetic layer tends to decrease.

Also, to improve the durability and the electromagnetic transfer characteristics, the binder, serving as a major component of the magnetic layer, also plays an important role. The materials used in the past such as vinyl chloride resin, cellulose resin, urethane resin, acrylic resin, etc. are low in anti-abrasive property of the magnetic layer, and this often results in contamination of running components of the magnetic tape.

To overcome the above problems, a method to use hard binder and to increase hardness of the magnetic layer is adopted.

Further, to improve the durability and the electromagnetic transfer characteristics, it has been proposed to provide at least two layers including an upper magnetic layer and a lower coating layer. For example, the use of aromatic polyurethane containing a structure of ethylene oxide or propylene oxide of bisphenol A in the magnetic layer other than the upper layer is disclosed in JP(A) 07176042. However, dispersion property of the lower layer is low, and both electromagnetic transfer characteristics and durability are not sufficient. Also, it is described that Tg=−50° C. to +50° C. In the embodiment, polyurethane and butanediol adipate polyol are used which use polyethylene oxide addition product of bisphenol A as chain extender, but Tg=−20° C., and strength of the entire coating film is decreased, resulting in lower durability.

The use of polyvalent OH urethane in the lower non-magnetic layer is disclosed in JP(A) 04238111. In the embodiment, a compound containing caprolactone polyol by 60% is used as a long-chain diol, but it is insufficient in dispersion property.

In JP(A) 02113424 and JP(A) 05242450, the use of urethane containing negative functional groups in an intermediate layer and a non-magnetic layer is disclosed. Although there is no description on the content of long-chain diol in polyurethane, polyester type compounds are used in the embodiment, while these are low in dispersion property and durability.

In JP(A) 03083221 (U.S. Pat. No. 5,258,223), the use of polyester urethane of Tg=−20 to +40° C. in an upper layer and the use of polyester urethane of Tg=−50° C. to −10° C. in a lower layer are disclosed. Because the value of Tg is low, the strength of coating film decreases, and durability is not satisfactory.

Further, in JP(A) 03088119 (EP 415,708), a magnetic recording medium is described, which uses aliphatic polyurethane in a lower layer and aromatic polyurethane in an upper layer. However, there is no description on the contents of long-chain diol, short-chain diol and ether. In the embodiment, it is described that Tg≦20° C. but strength of coating film is low, and durability and dispersion property are not sufficient.

It is an object of the present invention to provide a magnetic recording medium, which has excellent dispersion property, high electromagnetic transfer characteristics, and high strength coating film, and hence exhibits excellent repeated running property and still durability.

SUMMARY OF THE INVENTION

The magnetic recording medium of the present invention comprises a lower coating layer where non-magnetic powder or ferromagnetic powder are dispersed in a binder and an upper magnetic layer where ferromagnetic powder is dispersed in a binder, said two layers provided on a non-magnetic support member, whereby said binder in the lower coating layer comprises polyurethane resin, which is a reaction product of diol and organic diisocyanate as major materials, a short-chain diol having cyclic structure is contained in the polyurethane resin by 17 to 40 weight %, a long-chain diol containing ether groups by 1.0 to 5.0 mmol/g is contained in the polyurethane resin by 10 to 50 weight %, and thickness of the upper magnetic layer is not more than 1 μm.

Also, the magnetic recording medium of the present invention is the magnetic recording medium as described above, wherein molecular weight of a short-chain diol having cyclic structure is not more than 500, and molecular weight of a long-chain diol having said ether group is 500 to 5000.

The magnetic recording medium of the present invention is a magnetic recording medium as described above, wherein said medium comprises 3 to 20 OH groups per molecule in the polyurethane resin.

Further, the magnetic recording medium of the present invention is the magnetic recording medium as described above, wherein the polyurethane resin has at least one type of polar group selected from the group containing —$SO_3M$, —$OSO_3M$, —COOM, —$PO_3M_2$, —$OPO_3M_2$, or —$NR_2$ (where M represents a hydrogen atom, alkali metal, alkali earth metal or ammonium, and R represents an alkyl group having 1 to 12 carbon atoms).

DESCRIPTION OF THE PREFERRED EMBODIMENTS

The short-chain diol having cyclic structure used as raw material of polyurethane resin, which is contained in a binder for the magnetic recording medium of the present invention, is a bisphenol A, hydrogenated bisphenol A given by the formula shown below, bisphenol S, bisphenol P and ethylene oxide or propylene oxide addition product of these compounds, cyclohexanedimethanol, cyclohexane diol, hydroquinone, bis(2-hydroxyethyl)tetrabromobisphenol A, bis(2-hydroxyethyl)tetrabromobisphenol S, bis(2-hydroxyethyl)tetramethlyl bisphenol S, bis(2-hydroxyethyl) diphenyl-bisphenol S, bis(2-hydroxyethyl)- diphenylbiphenol, bis(2-hydroxyethyl)thiodiphenol, bis(2-hydroxyethyl)bisphenol F, biphenol, bisphenolfluorene, bisphenolfluorenedihydoxyethylether, or more preferably, hydrogenated bisphenol A, bisphenol S, bisphenol P and ethylene oxide or propylene oxide addition product of these compounds, or a diol containing aromatic or aliphatic compound such as cyclohexanedimethanol, cyclohexanediol, etc.

Formula 1

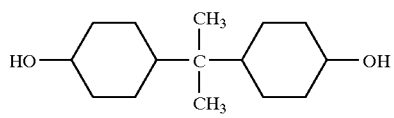

Or more preferably, hydrogenated bisphenol A given by the formula 1 and ethylene oxide or propylene oxide addition product of this compound may be used.

The short-chain diol is contained in the polyurethane resin preferably by 17 to 40 weight %, or more preferably by 20–35 weight %. If it is contained by less than 17 weight %, the coating film obtained is too soft. Sufficient strength cannot be attained, and still durability is low. If it is contained by more than 40 weight %, solubility in solvent decreases, and dispersion property of non-magnetic powder or magnetic powder tends to decrease. As a result, electromagnetic transfer characteristics of the upper magnetic layer coated on the upper layer tends to decrease, and strength of the coating layer is reduced.

The short-chain diol having cyclic structure has preferably molecular weight of 50 to 500, or more preferably 100 to 300. If it is less than 50, the magnetic layer is too fragile, and durability is low. If it is more than 500, glass transition temperature (Tg) of the coating layer decreases, and it becomes too soft and durability is low.

The polyurethane resin preferably contains ether groups by 1.0 to 5.0 mmol/g, or more preferably by 2.0 to 4.0 mmol/g. If it is less than 1 mmol/g, adsorption property to fine powder decreases, and dispersion property also decreases. On the other hand, if it is more than 5.0 mmol/g, solubility in solvent decreases, and dispersion property is low.

The polyurethane resin preferably contains 3 to 20 OH groups per molecule, or more preferably 4–5 OH groups per molecule. If it contains less than 3 OH groups per molecule, reactivity with isocyanate hardening agent decreases. As a result, the strength of the coating film decreases, and durability tends to be low. If it contains more than 20 OH groups, solubility in solvent decreases, and dispersion property tends to be low.

The long-chain diol containing ether groups, which is a major raw material of the polyurethane, is preferably contained by 10 to 50 weight %, or more preferably by 30 to 40 weight %. If it is less than 10 weight %, solubility in solvent decreases, and dispersion property decreases. If it is more than 50 weight %, the strength of the coating film decreases, and durability tends to be low.

More concretely, the long-chain diol includes bisphenol A, hydrogenated bisphenol A, bisphenol S, bisphenol P and ethylene oxide or propylene oxide addition product of these compounds, polypropylene glycol, polyethylene glycol, polytetramethylene glycol. More preferably, it includes bisphenol A, hydrogenated bisphenol A and ethylene oxide or propylene oxide addition product of these compounds. In particular, it is preferable to use a compound given by the following formula 2:

Formula 2

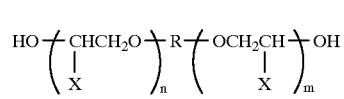

R is at least one selected fom the next group

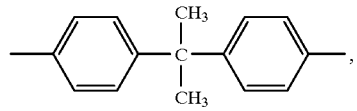

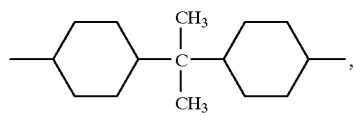

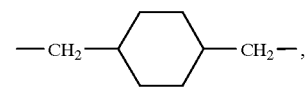

where the value of n or m is 3 to 24, or preferably 3 to 20, or more preferably 4 to 15. If n or m is less than 3, urethane bonding concentration is too high. As a result, solubility in solvent decreases, or the coating film tends to be fragile, and dispersion property and durability tend to decrease. If it is more than 24, the coating film tends to be too soft, and still durability decreases.

In the long-chain diol, R is preferably one of (1) or (2) shown below, or more preferably (1).

(1)

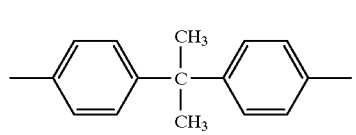

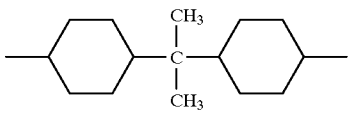
(2)

In the product of the present invention, the polyurethane resin has cyclic structure. Thus, it is the coating film of high strength and good durability. Because it has a branched $CH_3$ of propylene, solubility in solvent is high, and dispersion property is excellent.

In the long-chain diol of the formula 2, X preferably represents a hydrogen atom or a methyl group, or more preferably, a methyl group.

Weight average molecular weight (Mw) of the long-chain diol is 500 to 5,000. If it is more than 5,000, strength of coating film decreases and the film becomes too soft, and durability is low.

Number average molecular weight (Mn) of the polyurethane resin of the present invention is preferably 5,000 to 100,000, or more preferably 10,000 to 50,000, or most preferably 20,000 to 40,000. If it is less than 5,000, strength of the lower coating layer decreases, and durability is low. If it is more than 100,000, solubility in solvent decreases, and dispersion property becomes too low.

Glass transition temperature Tg of the polyurethane resin of the present invention is 50 to 200° C., and it is preferably 80 to 150° C., or more preferably 100 to 130° C. If it is less than 50° C., the strength of the lower coating layer at high temperature decreases, and durability and preservation property are too low. If it is more than 200° C., calender formability decreases, and electromagnetic transfer characteristics becomes too low.

As a compound used for adjustment of content of OH groups in the polyurethane resin, a compound having 3 or more functional OH groups may be used. More concretely, trimethylolethane, trimethylolpropane, trimellitic acid anhydride, glycerine, pentaerythritol, hexanetriol, etc. may be used. Branched polyester or polyetherester having 3 or more functional OH groups, which is obtained by using dibasic acid used as raw material of polyester polyol described in JP 6-64726 as explained as the prior art and obtained with the above compound as glycol component may be used. Preferably, the one having 3 functional groups is preferably used. If it contains 4 or more functional groups, it tends to be gelated in reaction process.

The binder comprising the polyurethane resin of the present invention preferably contains in the molecule at least one type of polar group selected from $-SO_3M$, $-OSO_3M$, $-COOM$, $-PO_3M'_2$, $-OPO_3M'_2$, $-NR_2$, $-N^+R_2R'COO^-$ (where M represents a hydrogen atom, alkali metal, alkali earth metal ammonium salt where M' represents a hydrogen atom, alkali metal, alkali earth metal or ammonium salt, R or R' represents an alkyl group, and X represents a halogen). More preferably, it is $-SO_3M$ or $-SOO_3M$. The quantity contained of the polar group is preferably $1\times10^{-5}$ to $2\times10^{-4}$ eq/g, or more preferably $5\times10^{-5}$ to $1\times10^{-4}$ eq/g. If it is less than $1\times10^{-5}$ eq/g, adsorption to magnetic or non-magnetic powder mixed in the lower coating layer is insufficient. As a result, dispersion property decreases. If it is more than $2\times10^{-4}$ eq/g, solubility in solvent is low, and dispersion property decreases.

In the binder of the present invention, vinyl chloride type synthetic resin may be simultaneously used in the polyurethane resin of the present invention. The degree of polymerization of the vinyl chloride resin for simultaneous use is preferably 200 to 600, or more preferably 250 to 450. The vinyl chloride resin may be produced by copolymerization of vinyl type monomer, e.g. vinyl acetate, vinyl alcohol, vinylidene chloride, acrylonitril, etc. Or, cellulose derivatives such as nitrocellulose resin, or acrylic resin, polyvinylacetal resin, polyvinylbutyral resin, epoxy resin, phenoxy resin, etc. may be simultaneously used. These compounds may be used in combination or alone.

In case other synthetic resin is simultaneously used, the polyurethane resin in the lower coating layer is contained in the binder preferably by 10 to 100 weight %, or more preferably by 20 to 100 weight %, or most preferably by 50 to 100 weight %. If it is less than 10 weight %, solubility in solvent decreases, and dispersion property becomes too low.

The vinyl chloride resin is preferably contained in the binder by 10 to 80 weight %, or more preferably by 20 to 70 weight %, or most preferably by 30 to 60 weight %.

For the short-chain diol having cyclic structure of the present invention, other diol may be simultaneously used. More concretely, aliphatic diol or cycloaliphatic diol such as ethylene glycol, 1,3-propylenediol, 1,2-propylene glycol, 1,4-butanediol, 1,5-pentanediol, 1,6-hexanediol, 2,2-diemethylpropanediol, 1,8-octanediol, 1,9-nonanediol, diethylene glycol, cyclohexane-1,4-diol, cyclohexane-1,4-dimethanol, etc., or aromatic diol such as bisphenol A, or ethylene oxide or propylene oxide addition product of bisphenol A or diol such as ethylene oxide or propylene oxide addition product of N-diethanolamine may be used.

Among these compounds, ethylene oxide addition product or propylene oxide addition product of bisphenol A or hydrogenated bisphenol A, or more preferably, propylene oxide addition product of bisphenol A is used.

By the use of these compounds, it is possible to obtain a coating film having high strength and high Tg value and high durability due to cyclic structure. Further, by the introduction of branched $CH_3$, high solubility in solvent and high dispersion property can be attained.

Organic diisocyanate may be contained in the binder of the present invention. As the organic diisocyanate compound, aromatic diisocyanate such as 2,4-tolylenediisocyanate, 2,6-tolylenediisocyanate, xylene-1,4-diisocyanate, xylene-1,3-diisocyanate, 4-4'-diphenylmethanediisocynate, 4,4'-diphenyletherdiisocyanate, 2-nitrodiphenyl-4,4'-diisocyanate, 2,2'-diphenylpropane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate, 3,3'-dimethoxydiphenyl-4,4'-diisocyanate, etc., aliphatic diisocyanate such as lysinediisocyanate, or cycloaliphatic diisocyanate such as isophoronediisocyanate, hydrogenated tolylenediisocyanate, hydrogenated diphenylmethane-diisocyanate, etc. may be used.

In case curing processing by electron beam irradiation is performed, a compound having reactive double bonding such as urethane acrylate may be used.

Total weight of resin component and curing agent (i.e. the weight of binder) is preferably within a range of 15 to 40 weight parts to 100 weight parts of magnetic powder, or more preferably, 20 to 30 weight parts.

As the other additives to be used in the magnetic layer or the non-magnetic layer of the present invention, those having lubricating effect, anti-static effect, dispersion effect, plasticizing effect, etc. may be used. These compounds include molybdenum disulfide, tungsten disulfide, graphite, boron nitride, graphite fluoride, silicone oil, silicone having polar group, fatty acid denatured silicone, fluorine-containing silicone, fluorine-containing alcohol, fluorine-containing ester, polyolefin, polyglycol, alkyl phosphate ester and its alkali metal salt, alkyl sulfate ester and its alkali metal salt, polyphenylether, fluorine-containing alkyl sulfate ester and its alkali metal salt, monobasic fatty acid, which may contain unsaturated bonding of 10 to 24 carbon or may be branched, or its metal salt (such as Li, Na, K, Ca, etc.), or monohydric, dihydric, trihydric, tetrahydric, pentahydric or hexahydric alcohol, which may contain unsaturated bonding or may be branched, and having 12 to 22 carbon atoms, alkoxy alcohol having 12 to 22 carbon atoms, mono-fatty acid ester or di-fatty acid ester or tri-fatty acid ester, containing one of either monobasic fatty acid, which may contain unsaturated bonding or may be branched, and having 10 to 24 carbon atoms and monohydric, dihyric, trihydric, tetrahydric, pentahydric or hexahydric alcohol, which may contain unsaturated bonding or may be branched, and having 2 to 12 carbon atoms, fatty acid ester of monoalkylether of alkylene oxide polymer, fatty acid amide having 8 to 22 carbon atoms, aliphatic amine having 8 to 22 carbon atoms. Concrete examples of these compounds include: lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, lauryl alcohol, etc.

Also, the following compounds may be used: nonionic surface active agent such as alkylene oxide type, glycerine type, or glycidol type alkylphenolethylene oxide addition product, etc., cationic surface active agent such as cyclic amine, esteramide, tertiary ammonium salt, hydantoin derivative, heterocyclic compounds, phosphonium or sulfonium, etc., anionic surface active agents containing acidic group such as carboxylic acid, sulfonic acid, phosphoric acid, sulfuric acid ester group, phosphoric acid ester group, etc., ampholytic surface active agent such as amino acids, aminosulfonic acids, sulfuric acid or phosphoric acid esters of amino alcohol, alkyl betaine, etc. These surface active agents are described in detail in "Handbook of Surface Active Agents" (published by Sangyo Tosho Co., Ltd.). These lubricants, antistatic agents, etc. may not be necessarily 100% pure and may contain impurities such as isomer, unreacted product, decomposed product, oxide, etc. in addition to major components. These impurities are preferably contained by less than 30%, or more preferably, by less than 10%.

The type and the quantity of these lubricants or surface active agents used in the invention may be varied according to the non-magnetic layer and the magnetic layer as necessary. For example, fatty acids having different melting points may be used for the non-magnetic layer and the magnetic layer to control bleeding to the surface, esters having different boiling points or polarities may be used to control bleeding to the surface, the quantity of surface active agent may be adjusted to improve stability of coating, or lubricating effect may be improved by increasing the quantity of lubricant to add to the non-magnetic layer. Of course, the type and the quantity of the agents are not limited to the above. All or a part of the additives used in the present invention may be added in any process in the manufacture of the magnetic coating material. For example, there are the cases where the additive is mixed with ferromagnetic powder prior to the kneading process, the case where it is added in dispersion process, or the case where it is added after dispersion, or the case where it is added immediately before the coating.

As the lubricating material used in the present invention, the following compounds may be used: NAA-102, castor oil cured fatty acid, NAA-42, Cation SA, Nymeen L-201, Nonion E-208, Anon BF, Anon LG, butyl stearate, butyl laurate, and erucic acid, (manufactured by Nippon Yushi Co., Ltd.), oleic acid (manufactured by Kanto Kagaku CO., Ltd.), FAL-205 and FAL-123 (manufactured by Takemoto Yushi Co., Ltd., Enujerb LO (manufactured by Shinnippon Rika Co., Ltd.), TA-3 (manufactured by Shinetsu Kagaku Co., Ltd.), Armide P (manufactured by Lion Armer Co.), Duomin TDO (manufactured by Lion Corporation), BA-41G (manufactured by Nisshin Oil Co., Ltd.), Profan 2012E, New Pol PE 61, and Ionet MS-400 (manufactured by Sanyo Kasei Co., Ltd.).

Description will be given now on the powder contained in the lower non-magnetic layer or the lower magnetic layer, which serve as the lower coating layer. Inorganic powder used in the lower coating layer of the present invention may be magnetic or non-magnetic powder. For example, in case of non-magnetic powder, it can be selected from inorganic compounds such as metal oxide, metal carbonate, metal sulfate, metal nitride, metal carbide, metal sulfide, etc. As the inorganic compounds, the following compounds may be used in combination or alone: $\alpha$-alumina with alpha ratio of 90 to 100%, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. In particular, titanium dioxide, zinc oxide, iron oxide or barium oxide are preferably used, or more preferably, titanium dioxide. Average particle size of the non-magnetic powder is preferably 0.005 to 2 $\mu$m. When necessary, non-magnetic powder having different particle sizes may be combined, or non-magnetic powder having wider particle size distribution may be used alone to provide similar effects. In particular, it is preferable to use non-magnetic powder having average particle size of 0.01 to 0.2 $\mu$m. It is preferable that pH value of the non-magnetic powder is between 6 to 9. Specific surface area of the non-magnetic powder is 1 to 100 $m^2/g$, or preferably 5 to 50 $m^2/g$, or more preferably 7 to 40 $m^2/g$. Crystallite size of the non-magnetic powder is preferably 0.01 to 2 $\mu$m. Oil absorption using DBP is 5 to 100 ml/100 g, or preferably 10 to 80 ml/100 g, or more preferably 20 to 60 ml/100 g. Specific gravity is 1 to 12, or more preferably 3 to 6. Shape may be needle-like shape or spherical, polyhedron or planar shape.

It is preferable that surface treatment is performed on the surface of the non-magnetic powder using $Al_2O_3$, $SiO_2$, $TiO_2$, $ZrO_2$, $SnO_2$, $Sb_2O_3$, or ZnO. In particular, it is preferable to use $Al_2O_3$, $SiO_2$, $TiO_2$, or $ZrO_2$, or more preferably to use $Al_2O_3$, $SiO_2$, or $ZrO_2$. These may be used in combination or alone. Depending on the purpose, coprecipitated surface treatment layer may be used, or a method to treat with alumina and then to treat surface layer with silica or a method reversing this procedure may be adopted. The surface treatment layer may be porous layer according to the purpose, but it is generally preferable that the surface treatment layer is homogeneous and dense.

When carbon black is mixed in the lower coating layer, the value of Rs can be decreased as already known, and the desired micro Vickers hardness can be obtained. For this purpose, furnace black for rubber, thermal black for rubber, carbon black for color, acetylene black, etc. may be used.

Specific surface area of carbon black is 100 to 500 $m^2/g$, or preferably 150 to 400 $m^2/g$. DBP oil absorption is 20 to 400 ml/100 g, or more preferably 30 to 200 ml/100 g. Average particle size of carbon black is 5 to 80 nm, or preferably 10 to 50 nm, or more preferably 10 to 40 nm. It is preferable that pH value of carbon black is 2 to 10, moisture content is 0.1 to 10%, and tap density is 0.1 to 1 g/ml. Concrete examples of the carbon black used in the present invention are as follows: BLACKPEARLS 2000, 1300, 1000, 900, 800, 880, 700, VULCAN XC-72 (manufactured by Cabot), #3050B, 3150B, 3250B, #3750B, #3950B, #950, #650B, #970B, #850B, MA-600 (manufactured by Mitsubishi Chemical Co., Ltd.), CONDUCTEX SC, RAVEN 8800, 8000, 7000, 5750, 5250, 3500, 2100, 2000, 1800, 1500, 1255, 1250 (manufactured by Columbia Carbon Co.), and Ketchenblack EC (manufactured by Akzo Co.).

For the lower coating layer of the present invention, magnetic powder can also be used. As the magnetic powder, alloy having $\gamma$-$Fe_2O_3$, Co-denatured $\gamma$-$Fe_2O_3$ or $\alpha$-Fe as major component or $CrO_2$, etc. may be used. In particular, it is preferable to use Co-denatured $\gamma$-$Fe_2O_3$. Ferromagnetic powder to be used in the lower layer of the present invention has preferably composition and performance characteristics similar to those of the ferromagnetic powder used in the upper magnetic layer.

The ferromagnetic powder used in the magnetic recording medium of the present invention is powder of ferromagnetic iron oxide, cobalt-containing ferromagnetic iron oxide or ferromagnetic alloy, and $S_{BET}$ specific surface area is 40 to 80 $m^2$/g, or more preferably 50 to 70 $m^2$/g. Crystallite size is preferably 12 to 25 nm, or more preferably 13 to 22 nm, or most preferably 14 to 20 nm. The length of longer axis is preferably 0.05 to 0.25 $\mu$m, or more preferably 0.07 to 0.2 $\mu$m, or most preferably 0.08 to 0.15 $\mu$m. As the ferromagnetic metal powder, powder of Fe, Ni, Fe—Co, Fe—Ni, Co—Ni, Co—Ni—Fe, etc. may be used, and an alloy may be used, which contains aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, or bismuth by less than 20 weight % of the metal components. The ferromagnetic metal powder may contain small quantity of water, hydroxide or oxide.

It is preferable that the magnetic recording medium of the present invention has polyester resin film such as polyethylene terephthalate, polyethylene naphthalate, etc. as the support member. In particular, when polyethylene naphthalate is used, it is possible to obtain a magnetic recording medium having high strength and good electromagnetic transfer characteristics.

Polyurethane of the present invention contains more of the short-chain diol having cyclic structure such as aromatic or cycloaliphatic structure compared with polyurethane compound already known. Thus, it is possible to obtain coating film having high strength and high Tg value compared with the polyurethane already known. In particular, this exhibits excellent repeated running performance at high temperature condition. Because short-chain diol content is high, urethane bonding concentration in polyurethane substantially increases, and this leads to higher strength and higher Tg value.

In the magnetic recording medium having multi-layer arrangement, when the thickness of the upper magnetic layer is decreased to improve electromagnetic transfer characteristics, strength of the entire coating film decreases. When the polyurethane of the present invention is used in the lower layer, it appears that strength of the coating film can be improved even when the magnetic layer is designed as thin layer.

In case of the polyurethane of already known type, when cyclic structure or urethane bonding concentration are increased, solubility in solvent decreases. As a result, dispersion property of the magnetic substance or non-magnetic powder decreases and smoothness of the lower layer is reduced, and smoothness of the upper layer is also reduced. The polyurethane of the present invention has excellent solubility in solvent and also has good dispersion property.

This may be attributable to the fact that the polyurethane of the present invention contains very small quantity of hydrophilic ether group and adsorption to magnetic substance or non-magnetic powder of polyurethane is enhanced without decreasing solubility in solvent, and this may have contributed to the improvement of dispersion property. Because adequate toughness can be provided, the entire coating film is not turned to fragile, and this is advantageous in that repeated running property is not decreased.

Because 3 or more OH groups are contained in a molecule, adsorption to the magnetic substance is more likely to occur, and it appears that this further improves dispersion property. Also, reactivity with isocyanate type curing agent used for general purpose is increased, and this contributes to improvement to obtain higher durability.

In the following, more detailed description will be given on the present invention, giving several examples:

EXAMPLE OF POLYURETHANE SYNTHESIS

In a container equipped with reflux condenser and agitator and with internal air replaced by nitrogen, each of the diols as shown in Table 1 was dissolved in cyclohexanone at 60° C. under nitrogen flow. Then, di-n-dibutyl-tin-dilaurate was added as catalyst by 60 ppm to total volume of the raw material used, and dissolution was continued for 15 minutes. MDI and TMP as shown in Table 1 were added, heating reaction was performed for 4 hours at 90° C., and polyurethane resin samples 1 to 13 were obtained.

OH content and molecular weight of each of the polyurethane samples are given in Table 1.

OH content of polyurethane resin is given by the number of OH groups per molecule, calculated from OH value obtained by the testing method of JIS K 0070 and from number average molecular weight based on polystyrene conversion obtained using GPC.

TABLE 1

| | Short-chain diol having cyclic structure and its content (%) | | Long-chain diol containing ether and its content (%) | | Other diols (%) | |
|---|---|---|---|---|---|---|
| 1 | HBpA | 17 | Compound A | 50 | | |
| 2 | ↓ | 40 | ↓ | 10 | PCL600 | 10 |
| 3 | ↓ | 17 | ↓ | 10 | ↓ | 40 |
| 4 | ↓ | 30 | Compound B | 15 | | |
| 5 | ↓ | 17 | Compound A | 50 | | |
| 6 | ↓ | 15 | ↓ | 50 | NPG | 2 |
| 7 | ↓ | 45 | ↓ | 10 | NPG | 5 |
| 8 | ↓ | 17 | ↓ | 8 | PPG600 | 1.2 |
| | | | | | PCL600 | 42.8 |
| 9 | ↓ | 17 | ↓ | 50 | | |
| 10 | ↓ | 17 | ↓ | 50 | | |
| 11 | ↓ | 20 | None | | PCL1000 | 50 |
| 12 | ↓ | 20 | Compound B | 50 | | |
| 13 | ↓ | 17 | Compound A | 55 | PPG400 | 2 |

TABLE 1-continued

| | DEIS (%) | MDI (%) | TMP (%) | Ether group content (mmol/g) | OH content (number of groups) | Number average molecular weight |
|---|---|---|---|---|---|---|
| 1 | 2 | 29 | 2 | 5.0 | 3 | 25000 |
| 2 | ↓ | 36 | ↓ | 1.0 | ↓ | 23500 |
| 3 | ↓ | 29 | ↓ | 1.0 | ↓ | 24000 |
| 4 | ↓ | 51 | ↓ | 5.0 | ↓ | 25000 |
| 5 | ↓ | 25 | 4 | 5.0 | 20 | 28000 |
| 6 | ↓ | 29 | 2 | 5.0 | 3 | 26000 |
| 7 | ↓ | 36 | ↓ | 1.0 | ↓ | 25000 |
| 8 | ↓ | 29 | ↓ | 1.0 | ↓ | 25000 |
| 9 | ↓ | 31 | 0 | 5.0 | 2 | 25000 |
| 10 | ↓ | 23 | 6 | 5.0 | 25 | 28000 |
| 11 | ↓ | 26 | 2 | 0.0 | 3 | 26000 |
| 12 | ↓ | 26 | 2 | 6.4 | 3 | 25000 |
| 13 | ↓ | 24 | 2 | 1.0 | 3 | 24500 |

In the above table, the symbol "%" indicates weight %, and OH content is given by the number of OH groups per molecule.

The diols given in Table 1 are as follows:

HBpA: Hydrogenated bisphenol A (Rikabinol HB; Shin-nippon Rika Co.)

Compound A: Polypropylene oxide addition product of bisphenol A (molecular weight: 600)

Compound B: Polypropylene oxide addition product of bisphenol A (molecular weight: 1000)

PCL 600: Polycaprolactone polyol (molecular weight: 600)

PCL 1000: Polycaprolactone polyol (molecular weight: 1000)

NPG: Neopentyl glycol

PPG 600 Polypropylene glycol (molecular weight: 600)

DEIS: Sulfoisophthalic acid ethylene oxide addition product

TMP: Trimethylolpropane

Example 1

The term "part(s)" in the examples indicates "weight part(s)".

Preparation of Coating Solution for the Upper Magnetic Layer

Using an open kneader, 100 parts of ferromagnetic alloy powder (composition: Fe 92%, Ni 4%, Zn 4%; Hc2000oe, crystallite size 15 nm, BET specific surface area 59 m²/g, longer axis diameter 0.12 μm, acicular ratio 7, σs140 emu/g) were pulverized for 10 minutes. Then, 7.5 parts of a compound ($SO_3Na=6\times10^{-5}$ eq/g; epoxy=$10^{-3}$ eq/g; Mw 30,000), which was obtained by adding hydroxyethyl sulfonate sodium salt to copolymer of vinyl chloride/vinyl acetate/glycidyl methacrylate (86:9:5), were kneaded with 10 parts (solid) of polyurethane resin (Toyobo; UR 8300) and 60 parts of cyclohexanone for 60 minutes. Then, the following compounds were added:

| | |
|---|---|
| Adhesive $Al_2O_3$ (particle size: 0.3 μm) | 2 parts |
| Carbon black (particle size: 40 nm) | 2 parts |
| Methylethylketone/toluene = 1/1 | 200 parts | and the mixture was dispersed in a sand mill for 120 minutes.

Then, the following compounds were added:

| | |
|---|---|
| Polyisocyanate (Nippon Polyurethane Co.; Coronate 3041) | 5 parts (solid) |
| Butyl stearate | 2 parts |
| Stearic acid | 1 part |
| Methylethylketone | 50 parts |

The mixture was further agitated and mixed for 20 minutes and was then filtered using a filter having average pore size of 1 μm, and the coating solution for the upper magnetic layer was prepared.

Preparation of Coating Solution for Lower Coating Layer

Using an open kneader, 85 parts of α-$Fe_2O_3$ hematite (average particle size 0.15 μm: $S_{BET}$ 52 m²/g; surface treatment $Al_2O_3$ and $SiO_2$; pH 6.5 to 8.0) were pulverized for 10 minutes. Then, 11 parts of a compound ($SO_3Na=6\times10^{-5}$ eq/g; epoxy=$10^{-3}$ eq/g; Mw 30,000), which was obtained by adding hydroxyethyl sulfonate sodium salt to copolymer of vinyl chloride/vinyl acetate/glycidyl methacrylate (86:9:5), were kneaded with 110 parts (solid) of polyurethane resin and 60 parts of cyclohexanone for 60 minutes. Then, Methylethylketone/cyclohexanone=6/4 200 parts were added, and the mixture was dispersed in a sand mill for 120 minutes. Further, the following compounds were added:

| | |
|---|---|
| Butyl stearate | 2 parts |
| Stearic acid | 1 part |
| Methylethylketone | 50 parts |

After agitating and mixing further for 20 minutes, the mixture was filtered using a filter having average bore size of 1 μm, and a coating solution for the lower coating layer was prepared.

On a polyethylene naphthalate non-magnetic support member of 10 μm in thickness, polyester resin containing sulfonic acid was coated as an adhesive layer using a coil bar so that the thickness after drying was to be 0.1 μm.

Then, the coating solution for the lower coating layer thus obtained was coated to have the thickness of 2.0 μm after drying and, immediately thereafter, coating solution for the upper magnetic layer was coated to have the thickness of 0.1 μm after drying, using reverse roll by simultaneous multi-layer coating. On the non-magnetic support member with the coating solution for the upper magnetic layer coated on it, magnetic orientation was performed using a magnet of 3000 gauss when the coating solution was not yet dried. After drying, calender treatment (speed 100 m/min,; linear pressure 300 kg/cm; temperature 90° C.) was performed by combination of metal roll—metal roll—metal roll—metal roll—metal roll—metal roll—metal roll. Then, it was cut to have a width of 8 mm.

Examples 2 to 5

Using the coating solution for the upper magnetic layer in Example 1, for each of these examples, a sample was prepared by the same procedure as in Example 1 except that the polyurethane resin 1 in the coating solution for the lower coating layer was replaced by the one shown in FIG. 2.

Example 6

A sample was prepared by the same procedure as in Example 1 except that the thickness of the upper magnetic layer was set to 1.0 μm.

Example 7

A sample was prepared by the same procedure as in Example 1 except that α-Fe$_2$O$_3$ for the lower layer was replaced by titanium oxide (average particle size 0.035 μm; crystallite rutile; TiO$_2$ content 90% or more; surface treatment layer—alumina; S$_{BET}$ 40 m$^2$/g; true specific gravity 4.1; pH=7).

Example 8

A sample was prepared by the same procedure as in Example 1 except that the polyurethane resin (Toyobo; UR 8300) for the upper layer was replaced by polyurethane 1.

Comparative Examples 1 to 5 and 7

A sample was prepared in each of the comparative examples by the same procedure as in Example 1 except that polyurethane resin shown in Table 2 was used instead of the polyurethane resin A.

Comparative example 6

A sample was prepared by the same procedure as in Example 1 except that thickness of the upper magnetic layer was set to 1.5 μm. The magnetic recording medium thus prepared was measured by the measuring method as described below. The results of measurement are shown in Table 2.

Measuring Method (1) Electromagnetic transfer characteristics: Using VTR (Sony Corporation; TR705) as specimen tape, a signal of 7 MHz was recorded and reproduced. Using the tape of Comparative example 2 as a standard tape, relative reproduction output was measured when reproduction output of 7 MHz of this tape was set to 0 dB.

(2) Ra: By optical interference method using digital optical profimeter (manufactured by WYKO), average roughness at central line was measured under cut-off value of 0.25 mm, and this was considered as Ra.

(3) Still durability: Under the condition of 40° C. and 80% relative humidity, VTR used in (1) above was used under still condition, and the time until reproduction output reached 50% of the recording signal (still durability time) was measured.

(4) Repeated running property: Using VTR of (1) above, a tape of 60-minute length was repeatedly and continuously run by 100 times under the condition of 40° C. and 80% relative humidity. Contamination of video head was checked. Video output was continuously recorded and output decrease was measured by setting the first output as 0 dB.

Video head contamination;
    Excellent . . . Contamination was not observed.
    No good . . . Contamination was found by visual inspection.

(5) Pot life of the coating solution for lower layer: Liquid viscosity of the coating solution immediately after preparation was measured by B type viscosimeter (Tokyo Keiki Co., Ltd.). The coating solution was stored in still condition for 5 hours at 23° C. If the viscosity of the coating solution increased more than the viscosity immediately after preparation, it was defined as "no good". If no change was observed, it was regarded as "excellent".

TABLE 2

| | Polyurethane | Short-chain diol with cyclic structure (wt %) | Ether-containing long-chain diol (wt %) | Ether content (mmol/g) | OH content (group/molecule) | Thickness of upper layer (μm) |
|---|---|---|---|---|---|---|
| Example 1 | 1 | 17 | 50 | 5.0 | 3 | 0.1 |
| Example 2 | 2 | 40 | 10 | 1.0 | 3 | 0.1 |
| Example 3 | 3 | 17 | 10 | 1.0 | 3 | 0.1 |
| Example 4 | 4 | 30 | 15 | 5.0 | 3 | 0.1 |
| Example 5 | 5 | 17 | 50 | 5.0 | 20 | 1.0 |
| Example 6 | 1 | 17 | 50 | 5.0 | 3 | 0.1 |
| Example 7 | 1 | 17 | 50 | 5.0 | 3 | 0.1 |
| Example 8 | 1 | 17 | 50 | 5.0 | 3 | 0.1 |
| Comparative example 1 | 6 | 15 | 50 | 5.0 | 3 | 0.1 |
| Comparative example 2 | 7 | 45 | 10 | 1.0 | 3 | 0.1 |
| Comparative example 3 | 8 | 17 | 8 | 1.0 | 3 | 0.1 |
| Comparative example 4 | 11 | 20 | 0 | 0.0 | 3 | 0.1 |
| Comparative example 5 | 12 | 20 | 50 | 6.4 | 3 | 0.1 |
| Comparative example 6 | 1 | 17 | 50 | 5.0 | 3 | 1.5 |
| Comparative example 7 | 13 | 17 | 55 | 1.0 | 3 | 0.1 |

| Ra (nm) | Ratio of roughness over 40 nm in wavelength (%) | Electromagnetic transfer characteristics (dB) | Output change (dB) | Contamination | Still durability (min.) | Coating solution for lower layer (pot life) |
|---|---|---|---|---|---|---|
| 2.8 | 75 | 0.9 | -0.2 | Excellent | 60 min. or more | Excellent |
| 2.7 | 74 | 1.1 | -0.3 | Excellent | 60 min. or more | Excellent |
| 2.8 | 76 | 0.9 | -0.1 | Excellent | 60 min. or more | Excellent |
| 2.8 | 75 | 1.0 | -0.3 | Excellent | 60 min. or more | Excellent |
| 2.9 | 72 | 1.0 | -0.2 | Excellent | 60 min. or more | Excellent |
| 2.6 | 72 | 1.2 | -0.2 | Excellent | 60 min. or more | Excellent |
| 2.8 | 74 | 1.0 | -0.3 | Excellent | 60 min. or more | Excellent |
| 2.6 | 74 | 1.0 | -0.2 | Excellent | 60 min. or more | Excellent |
| 3.6 | 100 | 0.0 | -1.0 | No good | 50 | No good |
| 3.2 | 98 | 0.2 | -1.1 | No good | 40 | No good |
| 3.6 | 101 | 0.0 | -1.3 | No good | 30 | No good |
| 3.5 | 100 | 0.0 | -0.9 | No good | 35 | No good |
| 3.4 | 100 | 0.0 | -1.0 | No good | 40 | No good |
| 3.5 | 100 | 0.0 | -1.0 | No good | 40 | Excellent |
| 3.4 | 98 | 0.2 | -0.7 | No good | 50 | Excellent |

As described above, polyurethane having a specific chemical structure is used as the binder for the coating solution of the lower layer in the magnetic recording medium of the present invention. As a result, dispersion property of the coating solution for the lower layer is improved. Surface property of the magnetic layer coated on the upper layer is improved, and electromagnetic transfer characteristics are also improved. The strength of the coating film is high, and still life and head contamination under high temperature condition are improved. Further, it is possible to obtain better pot life of the coating solution for the lower layer as an unexpected effect.

In the present invention, polyurethane is used in the lower layer instead of being used in the upper layer only or in single layer. Accordingly, liquid viscosity of the coating solution for the lower coating layer is stable, and this makes it suitable for multi-layer coating. In particular, when it is used for the lower layer in case of multi-layer coating, the ratio of roughness over 40 nm generated by aggregation of coating solution decreases. This makes it possible to prevent spacing loss with head and to obtain higher electromagnetic transfer characteristics.

What we claim is:

1. A magnetic recording medium, comprising a non-magnetic support, a lower layer comprising non-magnetic powder or ferromagnetic powder and a binder, and an upper magnetic layer comprising ferromagnetic powder and a binder, wherein the binder of the lower layer comprises a polyurethane resin, which is a reaction product of diol and organic diisocyanate, wherein said diol comprises short-chain diol and long-chain diol, said short-chain diol having cyclic structure and said short-chain diol being present in an amount of 17 to 40 weight % of the polyurethane resin, said long-chain diol containing ether groups in an amount of 1.0 to 5.0 mmol/g based on the polyurethane resin, said long-chain diol being present an amount of 10 to 50 weight % of the polyurethane resin, and the thickness of the upper magnetic layer is not more than 1 $\mu$m, and wherein said short-chain diol has a molecular weight of less than 500, and said long-chain diol has a molecular weight of from 500 to 5000.

2. A magnetic recording medium according to claim 1, wherein the polyurethane resin contains 3 to 20 OH groups per molecule.

3. A magnetic recording medium according to claim 1, wherein the polyurethane resin contains at least one polar group selected from the group consisting of —$SO_3M$, —$OSO_3M$, —COOM, —$PO_3M_2$, —$OPO_3M_2$, and —$NR_2$, where M represents a hydrogen atom, alkali metal, alkali earth metal or ammonium, and R represents an alkyl group having 1 to 12 carbon atoms, in a molecule.

4. A magnetic recording medium according to claim 1, wherein the polyurethane resin contains 3 to 20 OH groups per molecule, and the polyurethane resin contains at least one polar group selected from the group consisting of —$SO_3M$, —$OSO_3M$, —COOM, —$PO_3M_2$, —$OPO_3M_2$, and —$NR_2$, where M represents a hydrogen atom, alkali metal, alkali earth metal or ammonium and R represents an alkyl group having 1 to 12 carbon atoms, in a molecule.

5. A magnetic recording medium according to claim 1, wherein number average molecular weight of said polyurethane resin is in a range from 5,000 to 100,000.

6. A magnetic recording medium according to claim 1, wherein glass transition temperature of said polyurethane resin is within a range of 50° C. to 200° C.

7. A magnetic recording medium according to claim 1, wherein amount of polar group of said polyurethane resin is within a range of $1\times10^{-5}$ to $2\times10^{-4}$ eq/g.

8. A magnetic recording medium according to claim 1, wherein said lower layer contains non-magnetic powder with average particle size of 0.005 to 2 $\mu$m.

9. A magnetic recording medium according to claim 1, wherein said lower layer contains non-magnetic powder of needle-like, spherical, polyhedron or planar shape.

10. A magnetic recording medium according to claim 1, wherein said lower layer contains non-magnetic powder having specific surface area of 1 to 100 $m^2$/g.

11. A magnetic recording medium according to claim 1, wherein said upper magnetic layer contains ferromagnetic powder having crystal size of 12 to 25 nm.

12. A magnetic recording medium according to claim 1, wherein said magnetic layer contains ferromagnetic powder with a length of 0.05 to 0.25 $\mu$m on a longer axis.

* * * * *